United States Patent [19]
Herbstritt

[11] Patent Number: 5,847,908
[45] Date of Patent: Dec. 8, 1998

[54] MACHINE HAVING CURRENT LOSS SHUTDOWN CIRCUIT WITH LOW RESISTANCE RELAY

[75] Inventor: Dale R. Herbstritt, Clemmons, N.C.

[73] Assignee: Ingersoll-Rand Company, Woodcliff Lake, N.J.

[21] Appl. No.: 992,374

[22] Filed: Dec. 17, 1997

[51] Int. Cl.⁶ .................................................. H02H 5/04
[52] U.S. Cl. .............................. 361/31; 361/87; 361/167; 361/187
[58] Field of Search ................................ 361/23, 34, 87, 361/93, 94, 99, 166, 167, 187

[56] References Cited

U.S. PATENT DOCUMENTS

| | | | |
|---|---|---|---|
| Re. 33,874 | 4/1992 | Miller | 361/79 |
| 3,700,972 | 10/1972 | Bates | 361/191 |
| 3,876,911 | 4/1975 | Schweitzer, Jr. | 361/102 |
| 4,022,598 | 5/1977 | Gucwa, Jr. et al. | 62/164 |
| 4,255,773 | 3/1981 | Jabbal | 361/45 |
| 4,291,356 | 9/1981 | Matthieu | 361/87 |
| 4,345,288 | 8/1982 | Kampf et al. | 361/31 |
| 4,404,612 | 9/1983 | Hughes et al. | 361/31 |
| 4,412,267 | 10/1983 | Hansen | 361/94 |
| 4,456,943 | 6/1984 | Judy | 361/160 |
| 4,727,448 | 2/1988 | Hanyuda et al. | 361/18 |
| 4,811,153 | 3/1989 | Sakatos | 361/88 |
| 4,849,849 | 7/1989 | Zucker et al. | 361/92 |
| 4,922,369 | 5/1990 | Sakatos | 361/88 |
| 4,922,370 | 5/1990 | Mulshine et al. | 361/88 |
| 4,933,799 | 6/1990 | Lai | 361/25 |
| 5,113,308 | 5/1992 | Takeda | 361/178 |
| 5,151,840 | 9/1992 | Siefken | 361/13 |
| 5,245,261 | 9/1993 | Ashley et al. | 318/558 |
| 5,245,496 | 9/1993 | Kim et al. | 361/30 |
| 5,287,048 | 2/1994 | Lakin et al. | 318/459 |
| 5,383,086 | 1/1995 | Wietelmann et al. | 361/152 |
| 5,418,675 | 5/1995 | Bodenheimer et al. | 361/20 |
| 5,442,515 | 8/1995 | Wallaert | 361/187 |
| 5,590,013 | 12/1996 | Harasawa | 361/187 |
| 5,611,177 | 3/1997 | Herbstritt | 52/111 |
| 5,648,887 | 7/1997 | Herndon et al. | 361/31 |

Primary Examiner—Jeffrey Gaffin
Assistant Examiner—Michael J. Sherry
Attorney, Agent, or Firm—Michael M. Gnibus

[57] ABSTRACT

A machine includes first and second electrically actuated components and a shutdown circuit electrically interconnected therewith. The shutdown circuit has a current sense relay element which is electrically connected to the first electrically actuated machine component. The current sense relay element includes a coil capable of generating a magnetic field in response to direct current flowing therethrough and a reed switch adjacent the coil which is movable between open and closed positions in response to the presence of the magnetic field. The reed switch is normally closed when the direct current flowing to the first electrically actuated machine component is at or above a predetermined level. The reed switch opens when the direct current flowing to the first electrically actuated machine component falls below the predetermined level. The shutdown circuit also includes a shutdown relay element electrically connected to the current sense relay element and the second electrically actuated machine component so that when the direct current flow falls below the predetermined level, the current sense relay element the shutdown relay element are opened and the first and second electrically actuated machine components are shutdown.

10 Claims, 3 Drawing Sheets

MACHINE HAVING CURRENT LOSS SHUTDOWN CIRCUIT WITH LOW RESISTANCE RELAY

BACKGROUND OF THE INVENTION

The invention relates to a machine with a machine current sensing circuit, and more particularly the invention relates to a machine with a machine current loss shutdown circuit having a low resistance current sense relay wherein the shutdown circuit causes the machine to shutdown if the current flow through the relay falls below a predetermined acceptable value.

During use of a machine, it is customary to monitor the operation of one or more of the various machine components in order to confirm that the machine components and machine are operating as required. For example, the operation of a machine prime mover or cooling fan might be monitored. Typically, such machine component monitoring is achieved using either primary or secondary detection methods. However, there are shortcomings associated with both of these conventional detection methods.

A secondary detection method is comprised of analyzing machine performance or operational data related to the operation of the associated component to determine if the machine component is operating efficiently. For example, if it is necessary to determine whether the machine cooling fan is operating as required, using secondary methods, the flow produced by the cooling fan might be compared to a predetermined acceptable value for this operating variables to make the required determination. The primary problem associated with secondary detection methods is the determination is not instantaneous, there exists a delay between the time a machine component stops operating as required and the time the parameter values are obtained from machine sensors and compared to the predetermined acceptable values. These secondary detection methods rely on measurement and analysis of variables that can change slowly, and do not react rapidly enough to protect other system components from damage. Another problem associated with secondary detection methods is the difficulty in measuring a parameter such as coil temperature rise in a generator.

As a result of shortcomings associated with secondary detection methods, it is often desirable to use instantaneous primary detection methods such as measuring the current drawn by the electronically driven machine component, to make the determination regarding machine operation. In order to instantaneously determine whether or not a machine or a machine component is operating as required, the current supplied to one or more electronically driven machine components may be sensed. Generally, in known direct current circuits, also referred to as "DC circuits", current sensing requires the use of a series resistor in the current path. FIG. 1 schematically illustrates such a conventional current sensing circuit, and the illustrated circuit is typically part of a more extensive machine electrical system (not shown).

The conventional current sensing system 150, monitors the current,i, supplied to machine component 152, which may be a cooling fan for example. The series resistor 154 with a low resistance is placed in series with component 152, and produces a small voltage drop proportional to the current,i, across the resistor 154. The voltage drop is measured or otherwise detected by an electronic measuring circuit 156 connected across the resistor 154. The measuring circuit controls a relay or switching device 158 to provide an output signal to a machine operator.

Because this conventional current sensing circuit 150 requires a voltage drop across resistor 154, the sensing circuit can only be utilized when electrically actuated machine component 152 is not affected by the voltage drop produced by series resistor 154. However even resistors with low resistance placed in high current circuits provide too much voltage drop. For example in a circuit with significant current flow, such as 10 amperes, the resistor 154 would typically be about 0.05 ohm and this voltage drop is too significant for a cooling fan to operate effectively. Moreover, in order to provide sufficient voltage to the device 156, typically a resistor with a greater resistance is required, and results in performance degradation of machine component 152. Similarly for low current circuits, the value of the resistance would need to be greater to generate measurable voltage input to the machine component, and the resulting voltage drop would likely cause performance degradation of the sensed device or circuit. In addition to the foregoing, such systems may be costly, and are not sufficiently reliable.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a machine including first and second electrically actuated machine components; and a machine current loss shutdown circuit comprising a low resistance current sense relay for sensing direct current flow through the current sense relay to ensure current is within a predetermined current range, said low resistance current sense relay means electrically connected to the first electrically actuated machine component; and the circuit further including a shutdown relay electrically connected to the current sense relay and the second electrically actuated machine component so that when the direct current flow is not within the predetermined current range, the current sense relay and shutdown relay are opened and the first and second electrically actuated machine components are shutdown.

The foregoing and other aspects will become apparent from the following detailed description of the invention when considered in conjunction with the accompanying drawing figures.

BRIEF DESCRIPTION OF THE DRAWING FIGURES

DESCRIPTION OF THE PREFERRED EMBODIMENT

Figure 1:
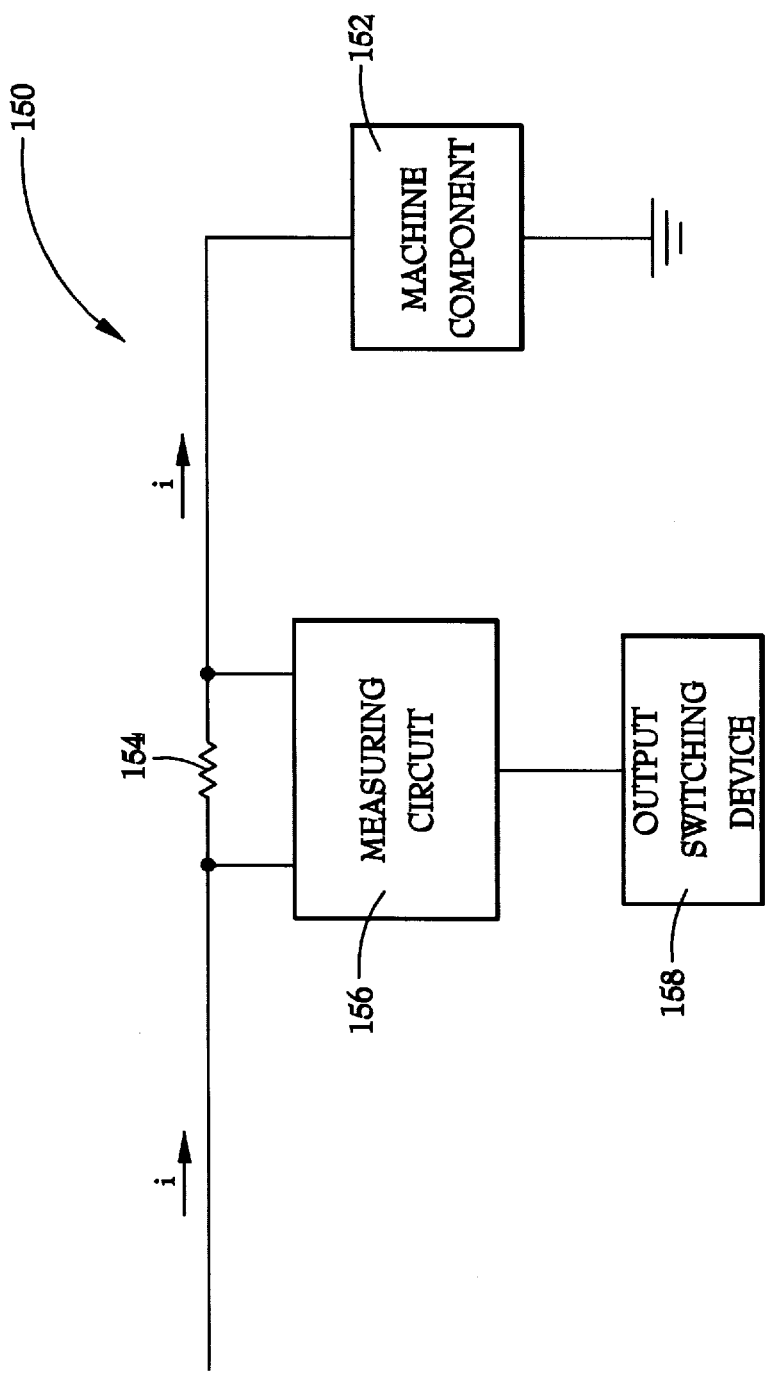
FIG. 1 is a schematic representation of a conventional current sensing circuit.
Figure 2:
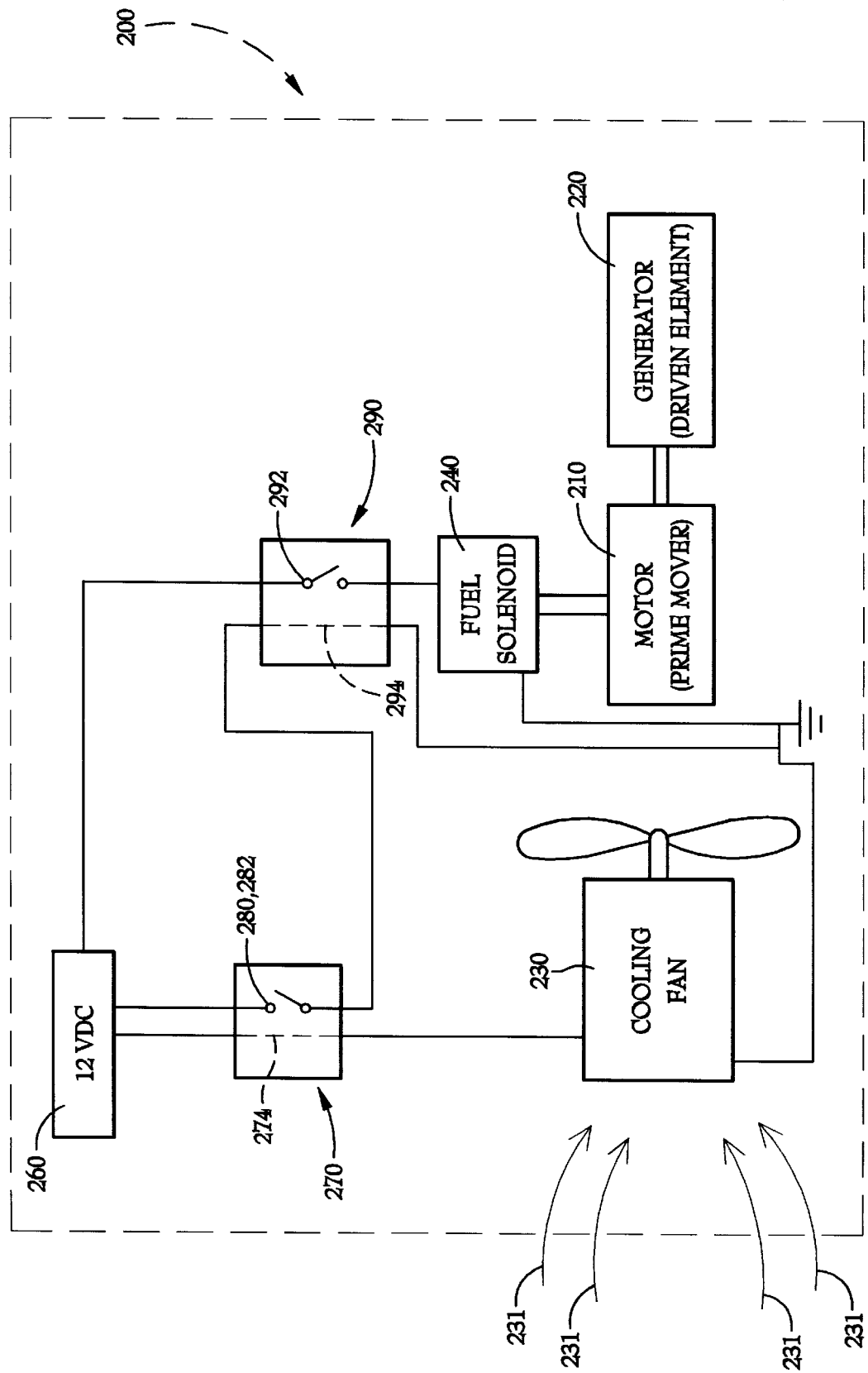
FIG. 2 is a schematic representation of the machine that includes the current loss shutdown circuit of the present invention.

Turning now to the drawings wherein like parts are referred to by the same number throughout the several views, and particularly FIG. 2, portable machine 200 which may be a light tower like the light tower described in U.S. Pat. No. 5,611,177, which is incorporated herein by specific reference. The portable machine may also be a fluid compressor or dryer.

Generally, the machine 200 includes a motor 210 which may also be referred to as a prime mover by those skilled in the art, which for purposes of describing the preferred embodiment of the invention drives a generator 220, however in an alternate embodiment, the motor could drive a compression module. An electrically actuated cooling fan 230 draws cooling air into the machine housing in the direction of arrows 231, to cool the machine components during machine operation. Electrically actuated fuel solenoid 240 is flow connected to the motor 210 and controls the supply of fuel to the motor during operation of the portable machine 200. It should be understood that the motor 210, generator 220, cooling fan 230, and fuel solenoid 240 may be any suitable conventional motor, cooling fan, generator or fuel solenoid well known to one skilled in the art and therefore no further description of these components of the machine 200 is required.

The machine 200 also includes a current loss shutdown circuit 250 which senses if the current supplied to fan 230 has fallen below a predetermined acceptable current value, and if the current has fallen below a predetermined minimum, current sense relay 270 and shutdown relay 290 are opened and the motor is shutdown. The low resistance current sense relay is adapted for use in high current such as 6–10 amperes, and when the current drops below 6 amps, the relay 290 shuts down the machine in the manner described below. In this way, damage to the machine and components due to loss of power is limited by circuit 250. Unlike conventional sensing circuits, the shutdown circuit of the present invention provides instantaneous direct sensing of device or current failure rather than depending on secondary detection methods and provides instantaneous sensing without significantly dissipating the power supplied to fan 230 or solenoid 240.

Power supply 260 provides 12 Volts DC to the cooling fan 230 and the resultant 6–10 amp current passes through relays 270, 290.

Figure 3:
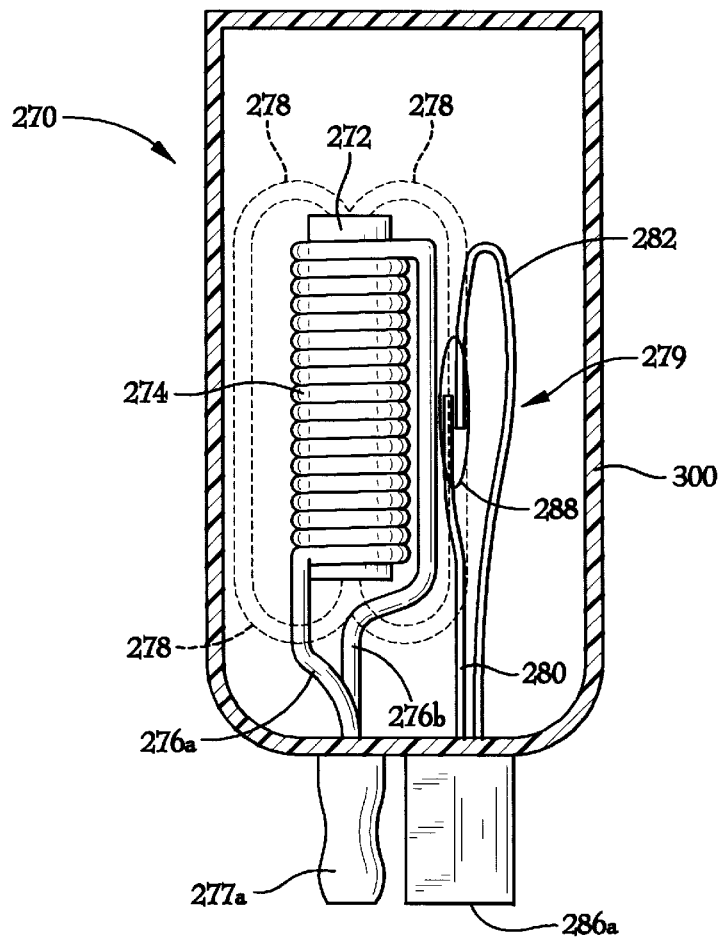
FIG. 3 is a pictorial representation of the low resistance current sense relay included in the machine current loss shutdown circuit of FIG. 2.
Figure 4:
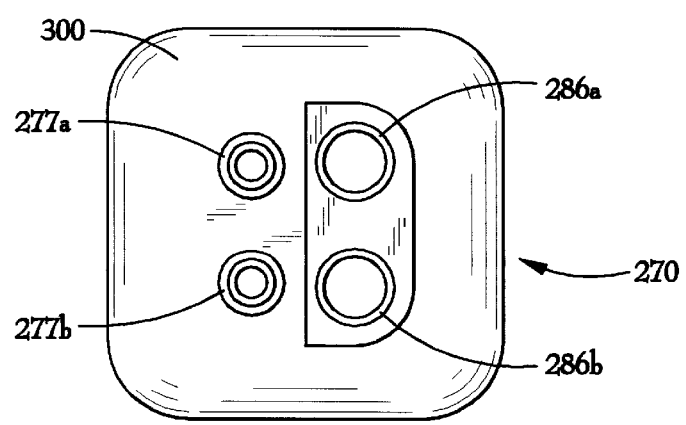
FIG. 4 is an end view of the low resistance current sense relay shown in FIG. 3.

The current sense relay 270 shown in FIG. 3 includes a ferrite core 272 with choke coil 274 wrapped around the core. The choke coil must be high current low resistance coil preferably with resistance of about 0.007 ohms, current of 10 amperes, and inductance of approximately 5 $\mu$H. The ends of the coil form input leads 276a and 276b which allow the relay 270 to be electrically connected with fan 230 by male leads 277a and 277b. During operation of machine 200, current flows through coil 274 and as a result, a magnetic field 278 is generated. The magnetic field is represented generally by dashed lines in FIG. 3. The current sense relay 270 may be located anywhere in the current loss shutdown circuit 250, and is independent of coil polarity, or references to circuit ground or supply voltage 260.

A conventional reed switch 279 is located proximate the core/coil combination of current sense relay 270 so that the switch contact ends of contacts 280, 282 are located in the produced magnetic field 278. The magnetic field produced during machine operation causes the free ends of contacts 280 and 282 to move into contact and close. The non-contact ends of the relay 270 form female leads 286a and 286b. The contact ends of the leads are enclosed in a glass capsule 288 in a manner well known to those skilled in the art. The components of relay 270 are enclosed in a non-metallic, non-ferrous molded housing or casing 300. The non-ferrous molded casing 300 protects the switch 279, coil 274 and core 272 from ambient moisture and other airborne contaminants by completely enclosing components 272, 274, and 279. The casing 300 is preferably a rubber material.

The relay 270 is electrically connected to fan 230 via leads 277a, 277b; and is electrically connected to shutdown relay 290 via leads 286a and 286b.

Shutdown relay 290 includes a switch 292 proximate a magnetic field producing coil 294 similar to coil 274 described above. The shutdown relay 290 is electrically connected to fuel solenoid 240. When the relay 270 is closed, relay 290 is also closed and power is supplied to the fuel solenoid. When relay 270 is opened, relay 290 is opened and power to the fuel solenoid is interrupted.

Operation of circuit 250 will now be described.

Referring to FIG. 3, choke coil 274 and its ferrite coil 272 are located proximate magnetic reed switch 279. As a result of current flow through the coil, the inductance of the choke helps develop magnetic field 278. The reed switch is located in the magnetic field and the magnetic field causes switch contacts 280, 282 to come into contact, providing an indication that a current sufficient to drive cooling fan 230 is flowing through coil 274. For purposes of the preferred embodiment, 6–10 amperes current is required to maintain the contacts 280, 282 closed. A current decrease to 4 amperes or less will be detected as a loss of current flow and the reed switch contacts 280, 282 will open. When the contacts are open, current is not flowed through coil 294, and as a result, switch 292 is opened terminating power to the fuel solenoid 240 and shutting off the supply of fuel to motor 210. Therefore, when power supply to the cooling fan 230 is lost, the motor is shutdown. By shutting the motor off in this manner, the present invention prevents high temperatures in machine 200 and prevents damage to machine components resulting from such high temperatures.

Because of the very low resistance in current sense relay 270, the performance of the cooling fan 230 in series with the coil will not be negatively affected by the presence of the current sense relay 270.

This invention enables direct sensing of loss of current to cooling fan and provides immediate motor shutdown to prevent a machine overheating. The invention eliminates the need to monitor other parameters of the machine to determine the need to shutdown the machine. A break in any circuit will result in a loss of power to the fuel solenoid and will result in engine shutdown.

In summary, the present invention enables instantaneous direct sensing of device or circuit failure rather than depending on secondary detection methods; allows significantly large level of relay coil current so that current through relatively large current devices and circuits can be detected without affecting performance of those devices and circuits; and generates a contact closure upon sensing of a direct current flow through the relay coil above a certain ampere level.

While I have illustrated and described a preferred embodiment of my invention, it is understood that this is capable of modification, and I therefore do not wish to be limited to the precise details set forth, but desire to avail myself of such changes and alterations as fall within the purview of the following claims.

Having described the invention, what is claimed is:

1. A machine comprising:

A) first and second electrically actuated machine components; and

B) a machine shutdown circuit comprising:

i) current sense relay means electrically connected to the first electrically actuated machine component, said current sense relay means including a coil capable of generating a magnetic field in response to direct current flowing therethrough and a reed switch adjacent said coil movable between open and closed positions in response to the presence of said magnetic field, wherein said reed switch is normally closed when the direct current flowing to said first electrically actuated machine component is at or above a predetermined level and said reed switch opens when the direct current flowing to said first electrically actuated machine component falls below the predetermined level; and ii) shutdown relay means electrically connected to the current sense relay means and the second electrically actuated machine component so that when the direct current flow falls below the predetermined level, the current sense relay means and the shutdown relay means are opened and the first and second electrically actuated machine components are shutdown.

2. The machine as claimed in claim 1, wherein the current sense relay means further comprises a core surrounded by said coil.

3. The machine as claimed in claim 2, wherein the core includes a ferrite core.

4. The machine as claimed in claim 3, wherein the coil is wrapped around the ferrite core so that the magnetic field for closing the reed switch is produced around the coil and ferrite core when a current at or above the predetermined level is flowed through the coil.

5. The machine as claimed in claim 2 wherein the relay coil has a resistance of about 0.007 ohms and an inductance of about 5 $\mu$H.

6. The machine as claimed in claim 1 wherein the first electrically actuated machine component is a cooling fan.

7. The machine as claimed in claim 1 wherein the second electrically actuated machine component is a fuel solenoid.

8. The machine as claimed in claim 1 wherein the machine is a light tower.

9. The machine as claimed in claim 1 wherein the machine is a fluid compressor.

10. A machine comprising:

A) an electrically actuated cooling fan;

B) a motor for driving said fan;

C) an electrically actuated fuel solenoid flow connected to the motor for controlling the supply of fuel to the motor during operation of the machine; and D) a machine shutdown circuit comprising:

i) current sense relay means electrically connected to the cooling fan, said current sense relay means including a coil capable of generating a magnetic field in response to direct current flowing therethrough and a reed switch adjacent said coil movable between open and closed positions in response to the presence of said magnetic field, wherein said reed switch is normally closed when the direct current flowing to said cooling fan is at or above a predetermined level and said reed switch opens when the direct current flowing to said cooling fan falls below the predetermined level; and ii) shutdown relay means electrically connected to the current sense relay means and the fuel solenoid so that when the direct current flow falls below the predetermined level, the current sense relay means and the shutdown relay means are opened and the motor is shutdown.

* * * * *